United States Patent
Chae et al.

(10) Patent No.: US 10,321,500 B2
(45) Date of Patent: Jun. 11, 2019

(54) METHOD AND APPARATUS FOR TRANSMITTING/RECEIVING SIGNAL BY DEVICE-TO-DEVICE UE IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 15/311,792

(22) PCT Filed: May 18, 2015

(86) PCT No.: PCT/KR2015/004972
§ 371 (c)(1),
(2) Date: Nov. 16, 2016

(87) PCT Pub. No.: WO2015/178648
PCT Pub. Date: Nov. 26, 2015

(65) Prior Publication Data
US 2017/0099688 A1    Apr. 6, 2017

Related U.S. Application Data

(60) Provisional application No. 61/994,989, filed on May 18, 2014, provisional application No. 62/075,844, (Continued)

(51) Int. Cl.
*H04W 76/14* (2018.01)
*H04L 27/26* (2006.01)
(Continued)

(52) U.S. Cl.
CPC ......... *H04W 76/14* (2018.02); *H04L 27/2607* (2013.01); *H04W 8/005* (2013.01); *H04W 84/042* (2013.01); *H04W 88/04* (2013.01)

(58) Field of Classification Search
None
See application file for complete search history.

(56) References Cited

U.S. PATENT DOCUMENTS

2011/0075684 A1* 3/2011 Zeng ............... H04L 1/1861
370/475
2011/0128883 A1* 6/2011 Chung ............. H04B 7/155
370/252

(Continued)

FOREIGN PATENT DOCUMENTS

| KR | 1020130018144 | 2/2013 |
|---|---|---|
| WO | 2010134749 | 11/2010 |
| WO | 2013137680 | 9/2013 |

OTHER PUBLICATIONS

PCT International Application No. PCT/KR2015/004972, Written Opinion of the International Searching Authority dated Sep. 1, 2015, 28 pages.

(Continued)

*Primary Examiner* — Jamaal R Henson
(74) *Attorney, Agent, or Firm* — Lee Hong Degerman Kang Waimey

(57) ABSTRACT

An embodiment of the present invention relates to a method for transmitting/receiving a signal by a device-to-device (D2D) UE in a wireless communication system, the method comprising the steps of: receiving a discovery signal; and checking a CRC of the discovery signal wherein when at least a part of the CRC is masked by a preconfigured sequence, the UE acquires, from the discovery signal, back- (Continued)

haul link quality information of an apparatus which has transmitted the discovery signal.

8 Claims, 6 Drawing Sheets

Related U.S. Application Data filed on Nov. 5, 2014, provisional application No. 62/159,983, filed on May 12, 2015.

(51) Int. Cl.
*H04W 8/00* (2009.01)
*H04W 84/04* (2009.01)
*H04W 88/04* (2009.01)

(56) References Cited

U.S. PATENT DOCUMENTS

| 2012/0002591 A1* | 1/2012 | Noh | H04B 7/15557 |
| | | | 370/315 |
| 2014/0003262 A1 | 1/2014 | He et al. | |
| 2014/0328329 A1* | 11/2014 | Novlan | H04W 72/042 |
| | | | 370/336 |
| 2017/0071024 A1* | 3/2017 | Sachs | H04W 4/70 |

OTHER PUBLICATIONS

LG Electronics, "Discussion on Public Safety UE-Network Relays", R1-134803, 3GPP TSG RAN WG1 Meeting #74bis, Oct. 2013, 4 pages.

* cited by examiner

FIG. 6
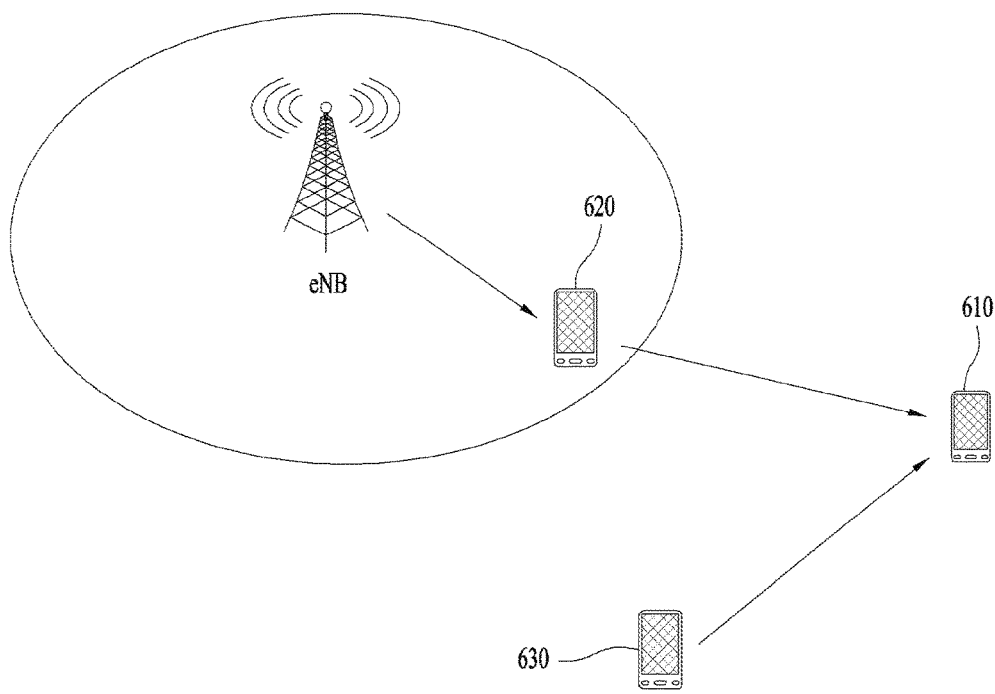
FIG. 7
(a) 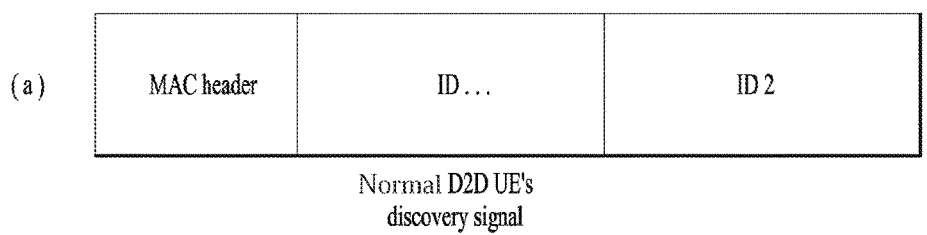
Normal D2D UE's discovery signal
(b) 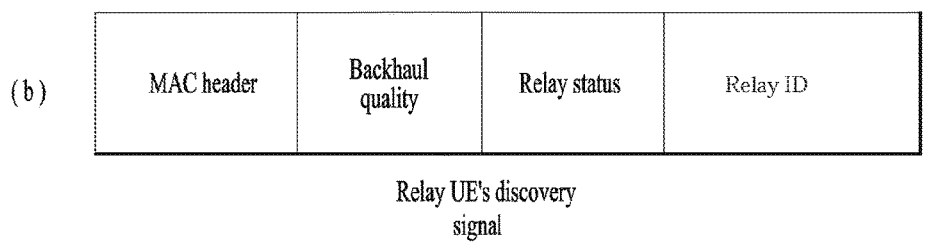
Relay UE's discovery signal

METHOD AND APPARATUS FOR TRANSMITTING/RECEIVING SIGNAL BY DEVICE-TO-DEVICE UE IN WIRELESS COMMUNICATION SYSTEM

CROSS-REFERENCE TO RELATED APPLICATIONS

This application is the National Stage filing under 35 U.S.C. 371 of International Application No. PCT/KR2015/004972, filed on May 18, 2015, which claims the benefit of U.S. Provisional Application No. 61/994,989, filed on May 18, 2014, 62/075,844, filed on Nov. 5, 2014 and 62/159,983, filed on May 12, 2015, the contents of which are all hereby incorporated by reference herein in their entirety.

TECHNICAL FIELD

The present invention relates to a wireless communication system, and more particularly, to a method and apparatus for transmitting and receiving signals in device-to-device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved NodeB (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

The technical task of the present invention is to a method capable of distinguishing between user equipments that transmit signals or types of signals in D2D communication.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided is a method of transmitting and receiving signals, which are transmitted and received by a device-to-device (D2D) user equipment (UE) in a wireless communication system, including: receiving a discovery signal; and checking a CRC of the discovery signal, wherein when at least a part of the CRC is masked with a predetermined sequence, the UE obtains, from the discovery signal, backhaul link quality information of a device that transmits the discovery signal.

When the CRC is masked with the predetermined sequence, the device that transmits the discovery signal may be a relay UE.

The UE may use the backhaul link quality information in selecting a relay UE.

A configuration of a discovery signal having a CRC masked with the predetermined sequence may be different from that of a discovery signal having a CRC not masked with the predetermined sequence.

A length of information bits of the discovery signal may not be related to a sequence used in masking the CRC.

The CRC of the discovery signal may be masked with a synchronization source ID and the predetermined sequence.

The CRC of the discovery signal may be scrambled with a predetermined RNTI and then an XOR operation may be performed with the predetermined sequence on the scrambled CRC.

In another technical aspect of the present invention, provided is a device-to-device (D2D) user equipment (UE) in a wireless communication system, including: a receiving module and a processor, wherein the processor is configured to receive a discovery signal and check a CRC of the discovery signal, and wherein when at least a part of the CRC is masked with a predetermined sequence, the UE obtains, from the discovery signal, backhaul link quality information of a device that transmits the discovery signal.

When the CRC is masked with the predetermined sequence, the device that transmits the discovery signal may be a relay UE.

The UE may use the backhaul link quality information in selecting a relay UE.

A configuration of a discovery signal having a CRC masked with the predetermined sequence may be different from that of a discovery signal having a CRC not masked with the predetermined sequence.

A length of information bits of the discovery signal may not be related to a sequence used in masking the CRC.

The CRC of the discovery signal may be masked with a synchronization source ID and the predetermined sequence.

The CRC of the discovery signal may be scrambled with a predetermined RNTI and then an XOR operation may be performed with the predetermined sequence on the scrambled CRC.

Advantageous Effects

According to the embodiments of the present invention, a D2D UE can identify a UE that transmits a public safety signal.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 6 and 7 are diagrams for explaining the embodiments of the present invention.

BEST MODE FOR INVENTION

Figure 1:
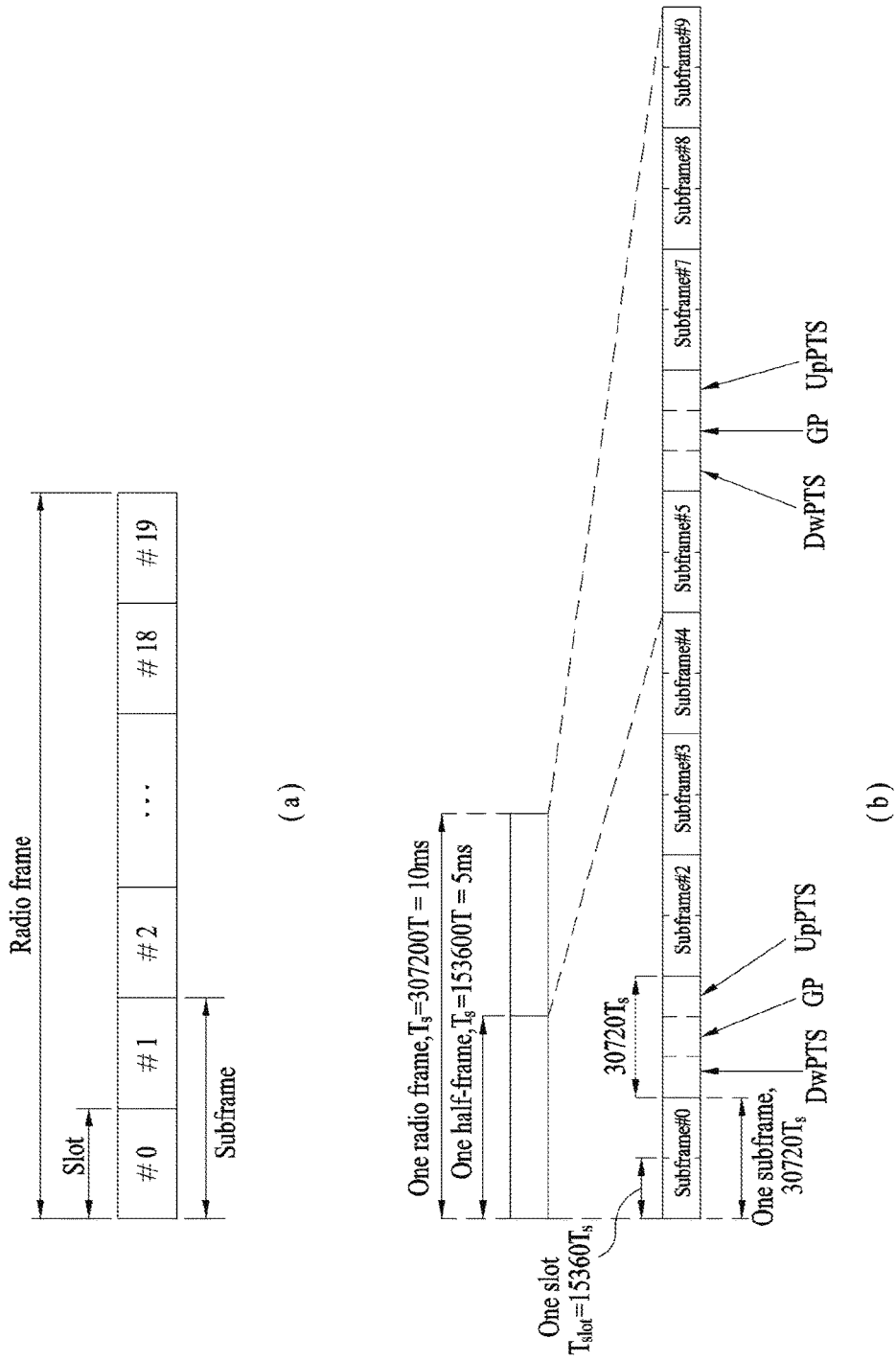
FIG. 1 is a diagram illustrating a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
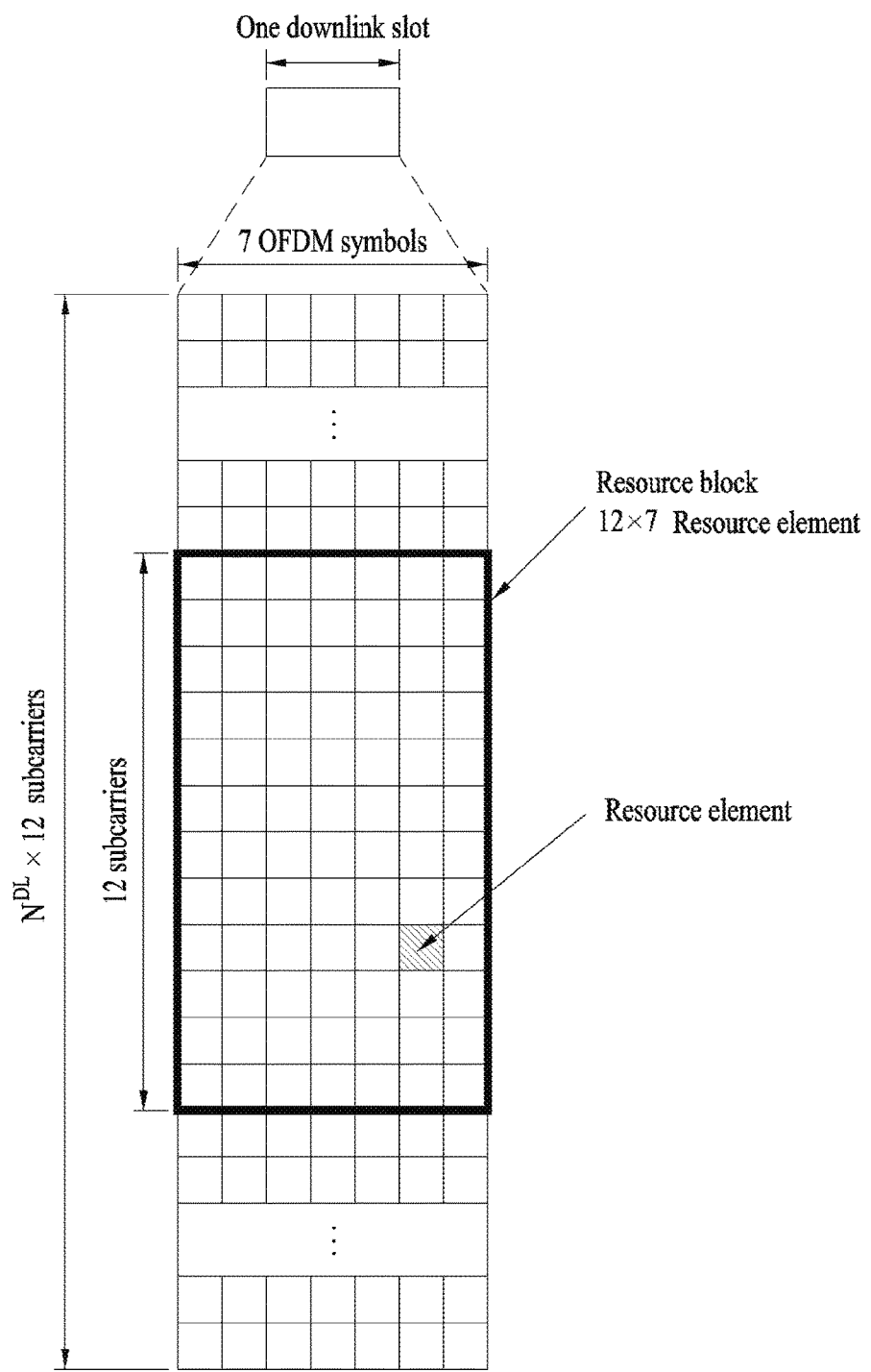
FIG. 2 is a diagram illustrating a resource grid of a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
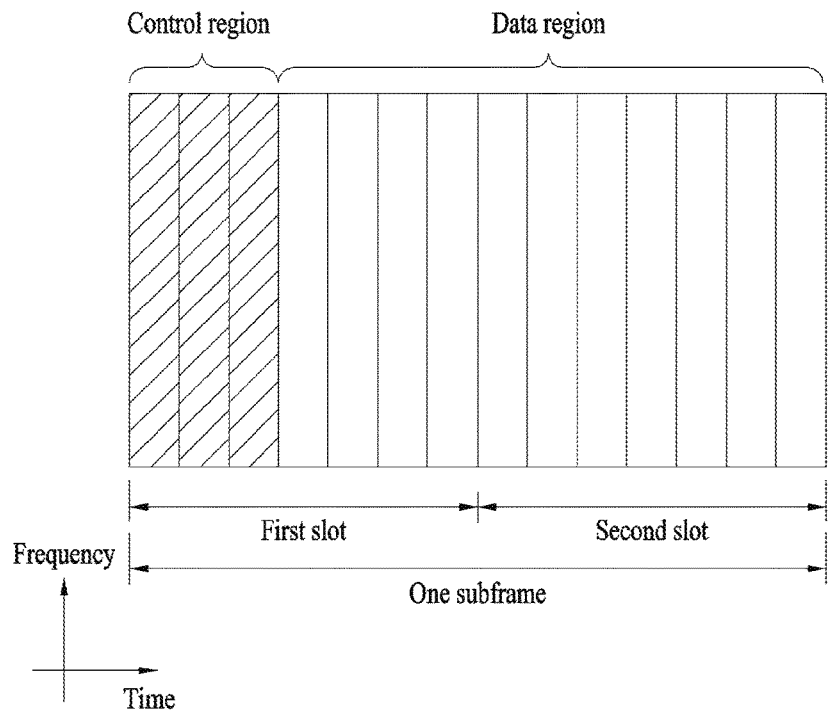
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
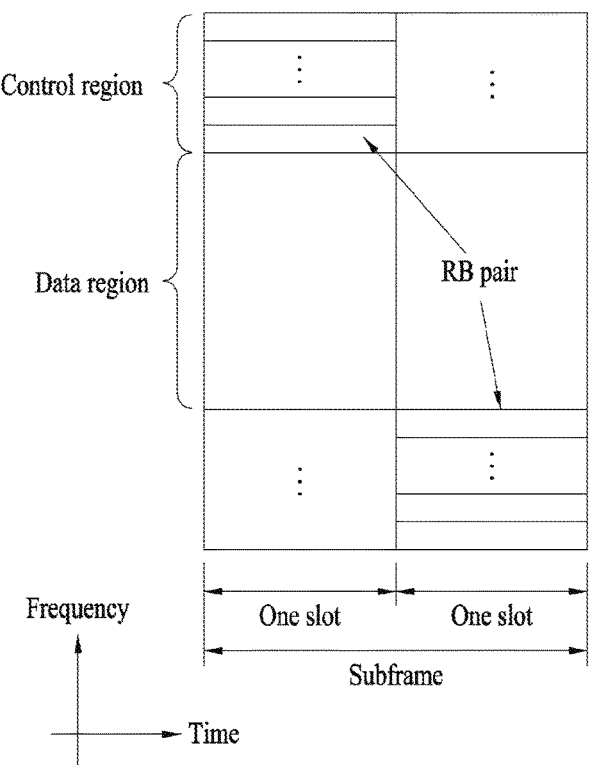
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Measurement/Measurement Report

Measurement report is performed for one or more methods (handover, random access, cell search, etc.) for securing mobility of a UE. Since the measurement report requires coherent demodulation in some degree, the measurement report can be performed after a synchronization parameter and a physical layer parameter are obtained by a UE except reception signal strength measurement. The measurement report can include RRM measurement including RSRP (reference signal receive power), RSSI (received signal strength indicator), RSRQ (reference signal received quality), etc. for measuring signal strength of a serving cell and a neighboring cell or signal strength compared to total reception power and RLM measurement capable of evaluating whether or not a radio link is failed by measuring link quality with a serving cell.

In relation to the RRM, the RSRP is a liner average of power distribution of an RE in which a CRS is transmitted in downlink. The RSSI is a linear average of total reception power received by a UE and the RSSI is measured for an OFDM symbol including an RS for an antenna port 0. The RSSI corresponds to a measurement value including interference, noise power, and the like. If higher layer signaling indicates a specific subframe to measure the RSRQ, the RSSI is measured for all OFDM symbols included in the indicated specific subframe. The RSRQ is a value measured in a form of N*RSRP/RSSI. In this case, the N corresponds to the number of RBs of a corresponding bandwidth at the time of measuring the RSSI.

The RLM is performed to determine whether a UE is 'in-synch' or 'out-of-synch' for a corresponding cell by making the UE monitor downlink quality of a serving cell of the UE. In this case, the RLM is performed based on a CRS. The downlink quality estimated by the UE is compared with 'in-synch threshold (Qin) and 'out-of-synch threshold (Qout)'. The thresholds can be represented by a PDCCH BLER (block error rate) of a serving cell. In particular, the Qout and the Qin correspond to 10% BLER and 2% BLER, respectively. Practically, the Qin and the Qout are values corresponding to SINR of a received CRS. If reception SINR of the CRS is equal to or greater than a predetermined level (Qin), a UE determines to attach to a corresponding cell. If the reception SINR is equal to or less than the predetermined level (Qout), the UE declares RLF (radio link failure.

Synchronization Acquisition of D2D UE

In the following, synchronization acquisition between UEs in D2D communication is explained based on the aforementioned description and a legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

A transmission period of a D2DSS is not less than 40 ms and one or more symbols can be used for transmitting a D2DSS in a subframe.

D2DSSs may include a primary D2DSS (PD2DSS) or a primary sidelink synchronization signal (PSSS) and a secondary D2DSS (SD2DSS) or a secondary sidelink synchronization Signal (SSSS). The PD2DSS may be configured to have a similar/modified/repeated structure of a Zadoff-chu sequence of a predetermined length or a primary synchronization signal (PSS), and the SD2DSS may be configured to have a similar/modified/repeated structure of an M-sequence or a secondary synchronization signal (SSS).

When a D2D UE selects a D2D synchronization source, it is necessary to apply an identical priority reference. In out-coverage situation, if signal strength of all received D2DSSs is equal to or less than a predetermined value, a UE may become a synchronization source. And, in in-coverage situation, an eNB can configure a UE as a synchronization source. If UEs match synchronization with each other from an eNB, a synchronization source may correspond to the eNB and a D2DSS may correspond to a PSS/SSS. A D2DSS of a synchronization source induced from an eNB may be different from a D2DSS of a synchronization source not induced from the eNB.

A PD2DSCH (physical D2D synchronization channel) may correspond to a (broadcast) channel on which (system) information (e.g., D2DSS-related information, duplex mode (DM), TDD UL/DL configuration, resource pool-related information, a type of application related to a D2DSS, etc.), which is basic information to be firstly known to a UE before a D2D signal is transmitted and received, is transmitted. The PD2DSCH can be transmitted in a subframe in which a D2DSS is transmitted or a following subframe.

The D2DSS may correspond to a specific sequence and the PD2DSCH may correspond to a sequence representing specific information or a codeword produced by predetermined channel coding. In this case, the SRN may be an eNB or a specific D2D UE. In the case of partial network coverage or out of network coverage, a UE may become a synchronization source.

Figure 5:
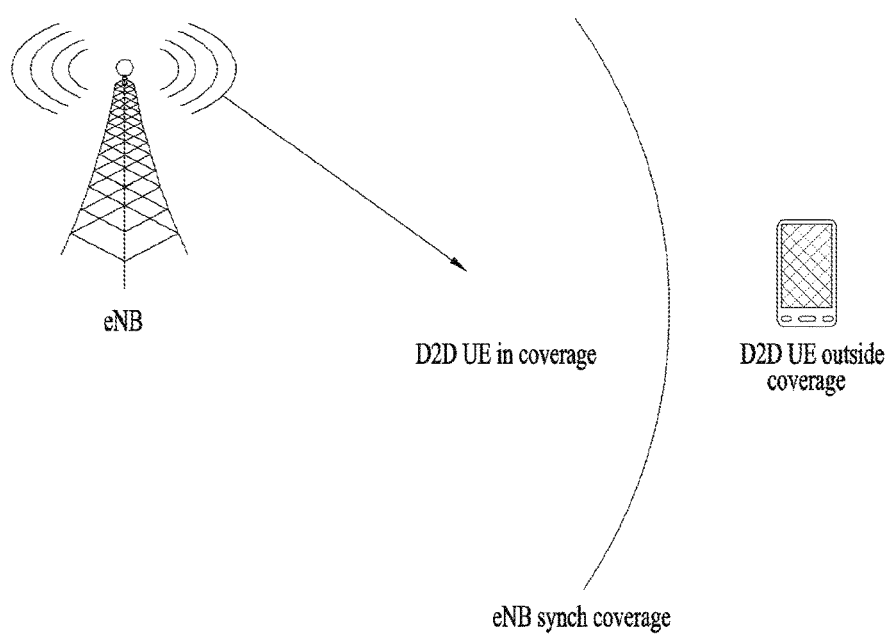
FIG. 5 is a diagram for explaining relay of a synchronization signal.

In the situation illustrated in FIG. 5, the D2DSS may be relayed for D2D communication with a UE located out of coverage. The D2DSS may be relayed through multiple hops. In the following description, relay of a synchronization signal can cover transmission of a D2DSS with a different format according to a time at which a synchronization signal is received as well as direct AF relay of a synchronization signal from an eNB. That is, as the D2DSS is relayed as described above, a UE located in the coverage can directly communicate with the UE located out of the coverage.

FIG. 6 shows an example in which a D2D UE 610 receives signals from a relay UE 620 and a D2D UE 610. In this situation, the D2D UE may need to distinguish between a signal transmitted by the relay UE and a signal transmitted by the D2D UE. When the relay UE enables an out-of-coverage UE to access a network for the purpose of public safety (PS), a signal therefor needs to be distinguished form a normal D2D signal. Moreover, although not shown in the drawing, the D2D UE may also need to distinguish whether the received signal is a signal transmitted by a PS UE or a signal transmitted by a non-PS (NPS) UE. Therefore, explained in the following description is a method for a D2D UE to distinguish whether a received signal is transmitted from a relay UE or a normal D2D UE (or, a PS UE or an NPS UE) after receiving the signal. Although the present invention is described focusing on the differentiation between the relay UE and the normal UE for convenience of description, the invention can also be used in distinguishing between the PS UE and the NPS UE.

Embodiment 1

When receiving a D2D signal (e.g., discovery signal, etc.), the D2D UE can check a CRC attached to the D2D signal. In this case, if at least a part of the CRC is masked with a predetermined sequence, the UE may recognize that the D2D signal has been transmitted from a relay UE.

As described above, the UE that transmits the D2D signal can be identified through the CRC and it implies that although different types of signals may have the same information bit field length (i.e., a length of information bits of a discovery signal is not related to the sequence used in the CRC masking), the signals may have different field configurations. That is, a configuration of a discovery signal having the CRC masked with the predetermined sequence may be different from that of a discovery signal having a CRC not masked with the predetermined sequence. FIG. 7 illustrates a relevant example. FIG. 7(a) shows a configuration of a discovery signal transmitted by a normal D2D UE and FIG. 7(b) shows a configuration of a discovery signal transmitted by a relay UE. Referring to FIGS. 7(a) and (b), it can be seen that the two discovery signal have the same information bit length but different sub-field configurations. Particularly, the discovery signal in FIG. 7(b) may contain a backhaul quality field, a relay status field, a relay ID field and the like. In other words, transmitted signals may have different filed configurations depending on the CRC. Thus, after performing decoding, a receiving UE checks the CRC and then grasps, based on a CRC field, how an information bit field is configured. Thereafter, the receiving UE can transmit a signal to a higher layer. If the at least the part of the CRC is masked with the predetermined sequence, the UE can obtain, from the D2D signal, backhaul link quality information of a device that transmits the D2D signal. Further, the UE may use the backhaul link quality information in selecting a relay UE.

Further, a description will be given regarding a masking method for a D2D signal. A CRC of a D2D signal may be masked with a synchronization source ID and a predetermined sequence. As a particular example, when a length of the CRC included in the D2D signal is 16-bit, 8-bit may be masked with the synchronization source ID and the remaining 8-bit may be masked with a sequence for distinguishing between the relay/normal D2D UEs (or PS/NPS UEs). In addition, in the case of a CRC of a discovery signal, it may be scrambled with a predetermined RNTI and then an XOR operation may be performed thereon with the predetermined sequence. As a particular example, when the CRC of the D2D signal is scrambled with a specific ID of 16-bit, the CRC may be masked again (i.e., XOR operation is performed) with a predetermined bit sequence. Specifically, this corresponds to a case of applying double-masking when the CRC is already masked for another purpose.

According to the method of applying different CRC masking, since a receiving UE can identify a transmitting UE (i.e., a UE type) by checking the CRC after performing decoding thereon, additional blind decoding is not required.

Embodiment 2

Whether a D2D signal is transmitted by a relay UE or a normal D2D UE (or whether the D2D signal is transmitted by a PS UE or an NPS UE) can be distinguished by a transmission resource region of the D2D signal. That is, a time and/or frequency resource region for each of the relay UE and the normal D2D UE may be signaled by an eNB or determined in advance. A configuration of the resource region may be signaled though a physical layer signal or a higher layer signal.

When a D2D signal transmitting UE can be identified through the resource region as described above, usage of a corresponding pool can be indicated using a usage index of the corresponding resource pool. Here, the usage index may be used to distinguish the relay UE/normal D2D UE. However, in some cases, the usage index may also be used to distinguish types of services/groups of the relay UE/normal D2D UE and in this case, they may be distinguished by a resource pool or a signal format. When resource pools are distinguished according to the usage index, if separate blind decoding is not required due to the same information bit length, the resource pools may overlap with each other. However, when D2D signals have different information bit lengths according to the usage index, if resource pools overlap with each other, bling decoding should be performed several times due to the different information bit lengths. Thus, in this case, it is preferred to design resource pools not to overlap with each other. Therefore, when the information bit lengths are the same in spite of different usage types, resource pools are allowed to overlap with each other. On the contrary, in the case of types with the different information bit lengths, resource pools are not allowed to overlap with each other.

When resource pools are not allowed to overlap with each other, the number of times of blind decoding may be limited in each usage type. Alternatively, the total number of times of blind decoding is limited and then the number of times of blind decoding may be configured per usage according to UE implementation. In this case, the number of times of blind decoding may be limited according to the usage type or according to the information bit length. This is because the number of times of blind decoding that a UE can perform in a specific subframe or during a prescribed time may be limited due to the limit of actual implementation.

On the other hand, when resource pools are allowed to overlap with each other (including a case in which since timing synchronization between a serving cell and a neighboring cell is not matched and signaling of a resource region through backhaul is also delayed, overlap between resource pools occurs), the resource pools may be configured or reconfigured such that a resource pool with a specific usage index is preferentially transmitted. To this end, a priority order between usage indices can be determined in advance. Such a priority order may be transmitted by a network through physical layer/higher layer signaling. Alternatively, the priority order may be shared by eNBs through backhaul signaling. For instance, if a part of a resource region allocated for a normal D2D UE of the serving cell collides with a part of a resource region allocated for a relay UE of a different cell, the colliding part of the resource region for the normal D2D UE of the serving cell may be configured to be used as a resource region for the relay UE of the different cell. Although the priority order according to the resource pool overlap may be configured by the eNB, a UE may be configured to receive only specific usage of a D2D signal when specific resource pools overlap.

For instance, when two resource pools overlap with each other as described in the above embodiment, a rule may be defined such that the D2D UE can receive a signal only from the relay UE. In addition, the priority between the usage indices may be predetermined according to a specific order or may be signaled by the network through a physical layer signal or higher layer signal.

As another method, when a signal transmitted by the relay UE and a signal transmitted by the normal D2D UE have the same information bit length, a UE may determine usage of a received signal through a filed for distinguishing between usage contained in a higher layer signal unlike differentiation through the CRC. As a further method, although the information bits have different lengths according to usage, actually transmitted bits are configured to have the same length through zero padding irrespective of the usage and then encoded. Thereafter, a receiving UE decodes the zero-padded information bits. In this case, since a bit at a specific location among the information bits is used to indicate the usage, the UE may know the actual information bit length of a D2D signal (i.e., how many bits are zero-padded) after decoding the corresponding bit. Thereafter, the UE may determine the actual information bits with respect to the corresponding usage.

When the (actual) information bit lengths are the same irrespective of the usage, the UE may know a configuration of higher layer fields of the corresponding D2D signal through the CRC. However, when the information bit lengths are changed according to usage, the UE should perform blind decoding on all the information bits with the different lengths and it may increase complexity in UE implementation. Therefore, if the information bits are configured to have the same length through the zero padding irrespective of usage and then encoding/decoding is performed on the corresponding information bits, decoding complexity of the UE cannot be increased.

Embodiment 3

Whether a D2D signal is transmitted by a relay UE or a normal D2D UE (or whether the D2D signal is transmitted by a PS UE or an NPS UE) can be distinguished by a size of a transmission resource.

In detail, resource sizes for the relay UE and the normal D2D UE can be configured to be different from each other according to a difference between information bit sizes or reliability requirements (for example, in the case of the relay UE, one discovery signal may occupy 4 PRBs whereas in the case of the normal D2D UE, it may occupy 2 PRBs) and a UE can distinguish between the relay UE and the normal D2D UE through the difference between the resource sizes. In order differentiate the resource sizes, DMRS CS (cyclic shift) and/or OCC (orthogonal cover code) may be configured differently. In this case, the DMRS CS and/or OCC may be configured differently between the relay UE and the normal D2D UE or may be configured to indicate the different resource sizes. In other words, the DMRS CS and/or OCC may be configured to indicate the different resource sizes or may be configured just differently between relay/normal D2D UE signals in order to distinguish between the relay/normal D2D UEs (when the relay UE and the normal D2D UE have the same resource size). As another example, in addition to the differentiation between the resource sizes for the relay/normal D2D UE signals, it is possible to differentiate time and/or frequency resources in order to distinguish between the relay UE and the normal D2D UE. This is because to simply a hopping pattern and prevent a receiving UE from performing blind decoding several times when signals with different sizes (e.g., different PRB units) are hopped. As a further example, transmission resource regions can be differentiated according to PRB sizes of signals, which are transmitted without the differentiation between the relay/normal D2D UEs.

Embodiment 4

Parameters for generating a sequence (e.g., a sequence ID, a seed ID of a random sequence generator, etc.) may be differently configured according to whether the parameters are for a relay UE or a normal D2D UE. In this case, the sequence may be a scrambling sequence and/or a DMRS base sequence.

Specifically, to distinguish between the relay UE and another UE or between the relay UE and the normal D2D UE, a part corresponding to a cell ID in the equation for generating the DMRS and/or scrambling sequences may be changed from 510 used in other D2D UEs to 511. In this case, a scrambling ID used for D2D may be intentionally selected from out of a range of cell IDs. Moreover, different scrambling ID (for generating the DMRS and/or scrambling sequences) may be used to distinguish between the relay UE and the normal D2D UE. The scrambling IDs used for the relay UE and the normal D2D UE may be determined in advance or the IDs may be signaled by the eNB through physical layer/higher layer signals.

The above-mentioned embodiments can be applied independently or by being combined with each other according to a type/scheduling scheme of a D2D signal. For instance, the embodiment 1 may be used in the case of a discovery signal and the embodiment 2 may be used in the case of a communication signal. As another example, in the case of discovery type 2/communication mode 1 in which scheduling is indicated by an eNB, a DMRS sequence ID and/or a scrambling ID may be matched with the configuration of the eNB to distinguish between the relay/normal D2D UEs. On the other hand, in the case of discovery type 1/communication mode 2, in which scheduling is not directly indicated by the eNB, a predetermined DMRS sequence ID and/or a predetermined scrambling ID may be used.

Device Configuration According to Embodiments of the Present Invention

Figure 8:
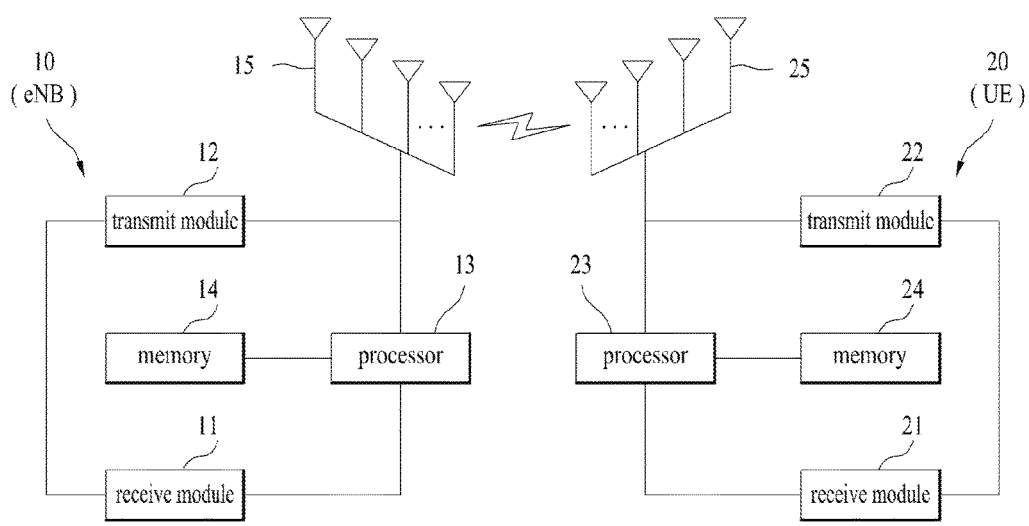
FIG. 8 is a block diagram illustrating configurations of transmitting and receiving devices.

FIG. 8 is a diagram illustrating configurations of a transmission point device and a user equipment device according to embodiments of the present invention.

Referring to FIG. 8, a transmission point device 10 according to the present invention may include a receiving module 11, a transmitting module 12, a processor 13, a memory 14 and a plurality of antennas 15. The plurality of the antennas 15 may mean that the transmission point device supports MIMO transmission and reception. The receiving module 11 can receive various signals, data and information in uplink from a user equipment. The transmitting module 12 can transmit various signals, data and information in downlink to the user equipment. And, the processor 13 can control overall operations of the transmission point device 10.

The processor 13 of the transmission point device 10 according to one embodiment of the present invention can handle the details required in each of the embodiments mentioned in the foregoing description.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 8, a user equipment device 20 according to the present invention may include a receiving module 21, a transmitting module 22, a processor 23, a memory 24 and a plurality of antennas 25. The plurality of the antennas 15 may mean that the transmission point device supports MIMO transmission and reception. The receiving module 21 can receive various signals, data and information in downlink from an eNB. The transmitting module 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 8 may be equally applied to a relay node device as a downlink transmission entity or an uplink reception entity. And, the description of the user equipment device 20 in FIG. 8 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In the case of implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In the case of implementation by firmware or software, a method according to each of the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various kinds of mobile communication systems.

What is claimed is:

1. A method of transmitting and receiving signals, which are transmitted and received by a device-to-device (D2D) user equipment (UE) in a wireless communication system, the method comprising:
   receiving a discovery signal;
   checking a Cyclic Redundancy Check (CRC) of the discovery signal,
   wherein the CRC of the discovery signal includes first bits masked with a synchronization source ID and second bits masked with a predetermined sequence;
   identifying whether the UE that transmitted the discovery signal is a relay UE or a non-relay UE based on the predetermined sequence masked in the second bits; and
   obtaining a backhaul link quality information from the discovery signal when the predetermined sequence is a sequence relating to the relay UE.

2. The method of claim 1, wherein the UE uses the backhaul link quality information in selecting the relay UE from a plurality of relay UEs.

3. The method of claim 1, wherein a configuration of a discovery signal is different according to the predetermined sequence masked in the second bits.

4. The method of claim 1, wherein a length of information bits of the discovery signal is not related to the predetermined sequence used in masking the second bits of the CRC.

5. A device-to-device (D2D) user equipment (UE) in a wireless communication system, comprising:
   a a receiver; and
   a processor,
   wherein the processor receives a discovery signal and check a Cyclic Redundancy Check (CRC) of the discovery signal,
   wherein the CRC of the discovery signal includes first bits masked with a synchronization source ID and second bits masked with a predetermined sequence,
   wherein the processor identifies whether the UE that transmitted the discovery signal is a relay UE or a non-relay UE based on the predetermined sequence masked in the second bits, and
   wherein the processor obtains a backhaul link quality information from the discovery signal when the predetermined sequence is a sequence relating to the relay UE.

6. The UE of claim 5, wherein the backhaul link quality information is used in selecting the relay UE from a plurality of relay UEs.

7. The UE of claim 5, wherein a configuration of a discovery signal is different according to the predetermined sequence masked in the second bits.

8. The UE of claim 5, wherein a length of information bits of the discovery signal is not related to the predetermined sequence used in masking the second bits of the CRC.

* * * * *